United States Patent [19]
Aderer

[11] Patent Number: 5,067,776
[45] Date of Patent: Nov. 26, 1991

[54] TRACK ADJUSTMENT WHEEL

[75] Inventor: Peter Aderer, Königswinter, Fed. Rep. of Germany

[73] Assignee: Lemmerz-Werke KGaA, Konigswinter, Fed. Rep. of Germany

[21] Appl. No.: 522,915

[22] Filed: May 14, 1990

Related U.S. Application Data

[63] Continuation-in-part of Ser. No. 270,612, Nov. 14, 1988, Pat. No. 4,925,248.

[30] Foreign Application Priority Data

Jun. 28, 1989 [DE] Fed. Rep. of Germany ....... 3921121

[51] Int. Cl.$^5$ .................................................. B60B 23/12
[52] U.S. Cl. .................................. 301/9 TV; 301/11 R
[58] Field of Search ................ 301/9 R, 9 DN, 9 TV, 301/10 R, 11 R, 10 DC

[56] References Cited

U.S. PATENT DOCUMENTS

| | | | |
|---|---|---|---|
| 1,582,494 | 4/1926 | Wagenhorst | 301/19 |
| 2,171,170 | 8/1939 | Beckman | 301/11 R |
| 2,254,361 | 9/1941 | Frudden | 301/18 |
| 2,294,256 | 8/1942 | Uber | 301/11 |
| 2,474,956 | 7/1949 | Ploehn | 301/9 TV |
| 2,476,766 | 7/1949 | Plotter et al. | 301/9 TV |
| 4,883,324 | 11/1989 | Fuchs et al. | 301/9 TV |
| 4,925,248 | 5/1990 | Aderer | 301/9 TV |

FOREIGN PATENT DOCUMENTS

| | | |
|---|---|---|
| 0025677 | 2/1985 | European Pat. Off. . |
| 837649 | 11/1957 | Fed. Rep. of Germany . |
| 1048171 | 12/1958 | Fed. Rep. of Germany . |
| 2247007 | 11/1975 | Fed. Rep. of Germany . |
| 7605257 | 7/1976 | Fed. Rep. of Germany . |
| 871754 | 1/1942 | France . |
| 1101487 | 1/1955 | France . |
| 666112 | 1/1952 | United Kingdom . |

Primary Examiner—Russell D. Stormer
Attorney, Agent, or Firm—Body, Vickers & Daniels

[57] ABSTRACT

A track adjustment wheel comprises an outer rim, a dish for attachment to a vehicle hub and U-shaped holding supports which are fastened to the rim by means of weld seams extending in the direction of the periphery of the rim and bolted to the dish. At the points where the holding supports are connected, the rim base is provided with the boss-like indentation projections which engage positively in the holding supports and against whose flanks the holding supports are supported laterally by their legs. The resulting formlocking axial connection takes axial wheel forces, so that the weld seams are relieved of these forces.

14 Claims, 3 Drawing Sheets

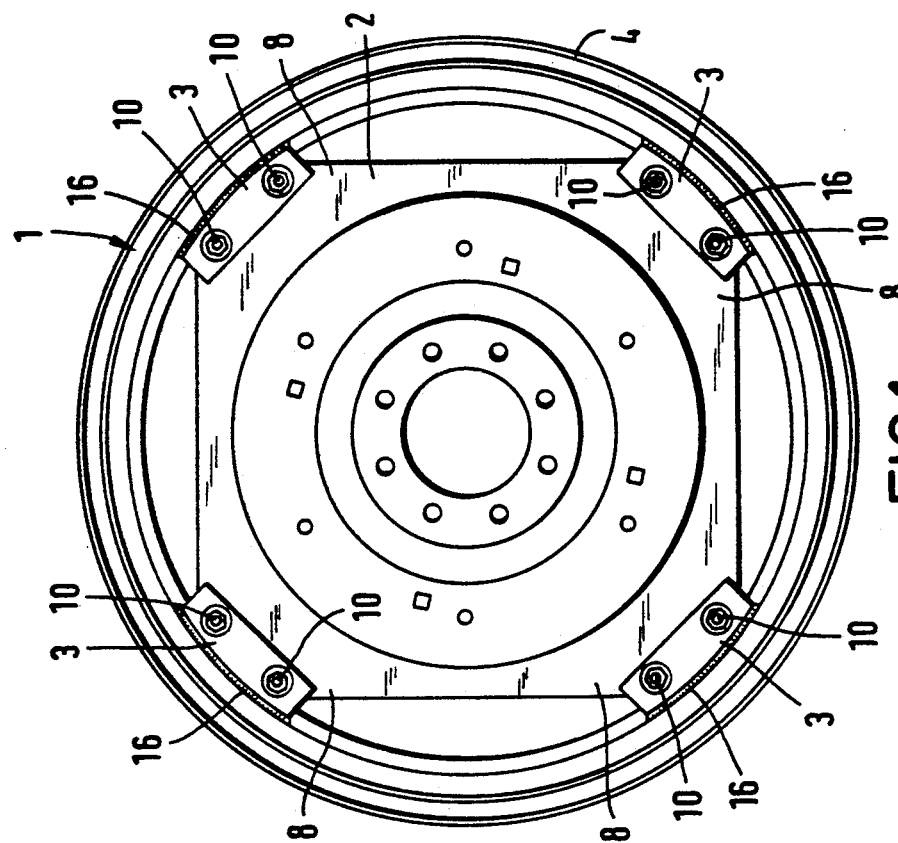
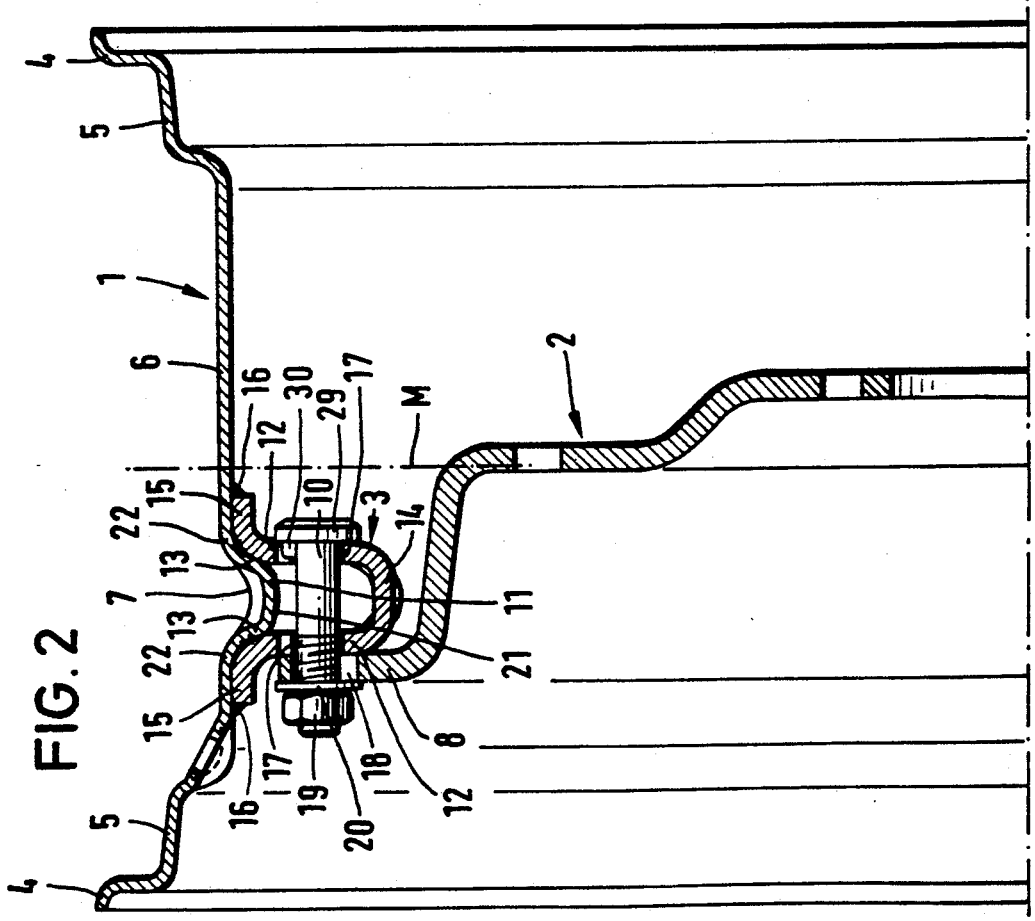

TRACK ADJUSTMENT WHEEL

This application is a continuation-in-part of Ser. No. 07/270,612, filed Nov. 14, 1988, now U.S. Pat. No. 4,925,248, issued May 15, 1990 to Peter Aderer.

FIELD OF THE INVENTION

The invention relates to a track adjustment wheel having a wheel disc detachably and displaceably fixed to holding supports on a wheel rim.

BACKGROUND OF THE INVENTION

Track adjustment wheels are used for the adjustment of the track width of, in particular, agricultural tractors and other vehicles for agricultural and forestry use. Usual track adjustment wheels have convex wheel discs or dished plates which can be fastened to the wheel rim in different axial adjustment positions. The rims are provided with holding supports which are distributed over their inner periphery and welded to them and to which the wheel dish, which may be multilobed, is connected. Various track adjustment settings, usually eight in number, are possible with known track adjustment wheels through the various positions of the rim relative to the convex wheel disc or of the latter relative to the wheel hub flange.

In the past numerous shapes have been proposed and used for the design of the holding supports serving to fasten the wheel disc by means of bolts, including U-shaped, angular or S-shaped holding supports and also so-called omega supports. Known holding supports are joined to the rim by means of axial weld seams or by means of weld seams extending in the peripheral direction of the rim, and sometimes also by means of a combination of such types; see e.g. DE-C-837 649, GB-A-666 112, DE-C-22 47 007, DE-GM 76 05 257, and EP-B-0 025 677. In the past it has also already been proposed to use other types of connection, for example rivet or clamp joints, for joining the rim to the convex wheel disc. A track adjustment wheel is for example known in which the rim is fastened to the wheel body by means of axial screw bolts, eccentric pins and clamp members on a radial bead extending around the rim base. In this case, to couple the rim for rotation with the wheel body, stop cams are disposed around the rim base (U.S. Pat. No. 2,254,361).

For track adjustment wheels and other wheels it is also known to use four-lobed convex wheel discs which can be made from square sheet metal blanks with a saving of material, and therefore economically (FR-PS 871 754). In the case of track adjustment wheels the convex wheel disc is here fastened by means of screw bolts at the four corners or lobes, either with the aid of a single fastening bolt in each case or by means of a pair of bolts, either single or double holding supports then being provided at the fastening points (EP-B-0 025 677).

Irrespective of the numerous known design shapes of the holding supports, in the past the latter have always been welded to the rims in such a manner that the axial and radial forces acting on the wheel during its use, and also the driving torque, are transmitted through the joints or weld seams. The high wheel loads occurring during use, which frequently act as impact forces, lead to considerable stresses and not infrequently also to deformation of the holding supports, as well as to unfavourable stressing of the weld joints. Therefore, under certain conditions of use of the tractors, rupture of the weld seams and/or of the holding supports is not uncommon. Rupture of the weld joints cannot reliably be prevented by reinforcement of the holding supports, which in any case entails increased production costs.

SUMMARY OF THE INVENTION

The object of the invention is therefore that of providing a track adjustment wheel which can be produced economically and which has improved strength properties of the connections between the holding supports and the rim, and thus in general of the fastening of the wheel dish, while the weld joints are relieved of load.

According to the invention this problem is solved by using generally U-shaped holding supports distributed around the inner periphery of the rim and fastened to it by their legs, and providing the rim base, at the sites of the holding supports, with boss-like projections, preferably formed by indentation, which engage positively in the holding supports, the legs of the latter being engaged laterally against the flanks of said indentations.

By this means the holding supports are therefore supported positively, on the hub side of the rim, against the boss-like projections, preferably indentations in the rim base, so that the forces acting in the axial direction of the wheel, that is to say the axial forces, are taken by the form-locking between the holding supports and the projections; the space between the legs of the holding supports is maintained by the indentations. At the same time, because of the screw prestressing forces applied in the connection between the wheel dish, the holding supports and the rim, a frictional connection is made between the holding supports and the projections of the rim which takes the radially and tangentially acting forces resulting from wheel load, driving and braking torques and impact forces. Through these positive and frictional connections weld joints, which preferably are used to fix the holding support legs to the rim, are largely relieved of forces which would otherwise be transmitted exclusively through the weld seams and the foot radii of the holding supports. This gives rise to a greatly reduced and in general a substantially more favourable stressing of the holding supports and of the joints, particularly weld seams, so that the possibility of rupture of the holding supports or weld seams can be substantially reduced. Because of the lateral support of the holding supports on the boss-like indentations, a tendency to deformation of the holding supports is also reduced.

During the manufacture of the steel wheel rim the projections in the rim base can be formed, without excessive extra cost, as boss-like indentations by cold-working with the aid of simple pressing tools. In that case it is immediately possible to give the local indentations a shape and dimensions such that the thickness of the rim base is not reduced excessively, which might otherwise endanger the strength of the wheel. The indentations formed in the production of the rim serve at the same time, during the subsequent attachment of the holding supports, as centering means aligning and centering the holding supports relative to the rim, whereby the connection of the holding supports in the correct positions on the rim is facilitated and thus improved true and plane running values can be achieved.

In this respect it is advantageous for the indentations to be made symmetrical to a diametral plane of the rim, with their bottoms convexly curved towards the wheel axis and with flanks which diverge towards the rim base and merge via curves into the rim base. In a preferred version, the projections are made in the form of locally projecting portions in a bead or groove extending around the rim base. The bead formed around the rim base effects at the same time a stiffening of the rim base, particularly also in the intermediate regions between the holding supports, so that additional advantages in respect of strength are achieved. The wheel disc used may be a multilobed e.g. a four-lobed dish, which may be inexpensively produced from a square metal sheet. The provision of the bead extending around the rim base also assists the formation of boss-like indentations, since for this purpose the bead has merely to be locally shaped to form them.

Such a bead expediently has a cross-section roughly shaped as a flat V. The width of the indentation projections may be approximately equal to the width of the bead. In that case it is also possible for the length of the projections, viewed in the direction of the periphery of the rim, to be made smaller than the length of the holding supports in the direction of the periphery of the rim. The projections, which preferably are situated in the region of bolt holes in the holding supports, desirably extend on both sides in the form of flat curves, from the bolt holes in the holding supports to the rim base.

As mentioned, the holding supports used are basically U-shaped supports whose two roughly parallel legs of the U are spaced a distance apart corresponding to the width of the boss-like indentations, in order to achieve the previously mentioned positive surface engagement with the flanks of the projections. The legs of the holding supports are expediently provided with outwardly directed flanges which bear against the rim base and at which the holding supports are welded to the rim base on both sides of the boss-like indentations. Owing to the fact that the holding supports are generally to be joined to the rim, on their flanges directed axially outwards, by weld seams extending in the peripheral direction of the rim, the weld seams are also advantageously situated in respect of stressing and in respect of the execution of the welding work.

With a view to the economical production of the track adjustment wheel, it is in addition advantageous for the holding supports to be, as is known per se, in the form of double supports, e.g. for the connection of a four-lobed convex wheel disc which can be made from a simple square sheet metal blank with a saving of material and therefore at low cost. The double supports each have two pairs of bolt holes. When double supports are used it is advantageous for the arrangement to be such that, at the site of each double support, the rim has two boss-like projections spaced apart to be substantially in circumferential register with the two pairs of bolt holes.

Particularly when the track adjustment wheel is to be used as a front wheel for tractors and the like, the holding supports may have a width, measured between their legs, which is considerably smaller than their (axial) height. The narrow holding supports need boss-like projections of correspondingly small dimensions for their positive connection.

U-shaped holding supports provide excellent component strength. In this respect it is advantageous for the section web of the U-shaped holding supports to be given, in the two end regions of the holding support, a curvature directed towards the outside of the section, with an inside radius of curvature larger than that between the web and the legs of the section in the intermediate region between the two end regions of the holding support. Preferably, in the two end regions the two section legs of the holding support are retracted into the interior of the section in the curved transition region to the curved section web, in relation to the position of the section legs in the intermediate region, while the radius of curvature between the section web and the section legs increases steadily, from the transition to the intermediate region, in the direction of the end of the holding support. The holes for the bolts used for the connection of the convex wheel disc are in this arrangement expediently disposed in the section legs away from the shaped end regions.

With these design features particularly good component strength is achieved for the holding supports. In particular, harmful concentrations of tension in the particularly endangered end regions of the holding supports are avoided. The increase of the radii of curvature of the transitions between the section legs and the section web of the holding support, in the end regions of the latter, leads to contact conditions between the holding support and the wheel disc attachment e.g. lobe, which are advantageous in respect of strength. Above all, it is possible to ensure that in the end regions of the holding support no contact is made with the wheel disc lobes, this contact being instead restricted to the middle portion of the length of the holding support, where the wheel disc lobe makes contact with the section leg of the holding support over a large area.

BRIEF DESCRIPTION OF THE DRAWINGS

An example of a preferred track adjustment wheel embodying the invention is now described with reference to the drawings, in which:

FIG. 1 is an elevation of a track adjustment wheel;

FIG. 2 is a partial radial section through a rim, holding support and wheel dish of the track adjustment wheel shown in FIG. 1;

DETAILED DESCRIPTION OF THE PREFERRED EMBODIMENTS

The track adjustment wheel in the form of a disc wheel which is shown in FIGS. 1 to 5 consists as regards its main parts of a rim 1, which carries a tire (not shown), a dished wheel disc 2 forming a connection member between the rim and the wheel hub, and holding supports 3 which serve for the detachable, displaceable connection of the wheel disc 2 to the rim 1.

Figure 3:
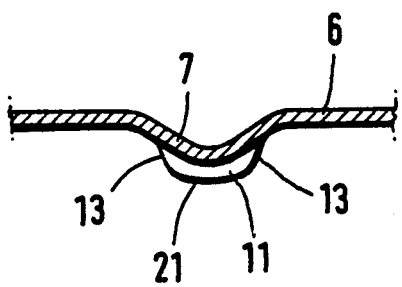
FIGS. 3 and 4 are each a partial section through a region of the rim base, showing a bead (FIG. 3) and a boss-like indentation formed therein (FIG. 4)
Figure 4:
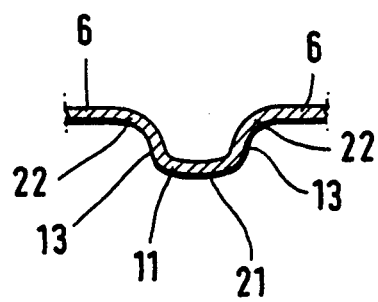

As shown particularly in FIG. 2, the one-piece rim 1, with its rim flanges 4, the rim shoulders 5 and the rim base 6, is in the form of a well-base rim, in the base of which a bead 7 is formed, which extends around it and which in cross-section has the shape of a flat V (FIG. 3). The bead 7, formed symmetrically to a radial plane, is offset in the rim base 6 according to the track width, relative to the radial centre plane M of the rim.

As FIG. 1 shows, the convex wheel disc 2 is in the form of a four-lobed dish, whose four lobes 8 are situated at the corners of the dish, the contour of which is approximately square. For the fastening of the wheel disc 2 to the rim 1 four holding supports 3 are consequently provided, offset at 90° from each other and which in the preferred example of embodiment are in the form of double supports. The wheel disc 2 is fastened to each holding support 3 with the aid of two threaded bolts 10, which are spaced from one another in the direction of the periphery of the rim.

At the site of each holding support the rim base is provided with boss-like indentation projections 11 which are directed radially inwards and are in the form of local pressed-out portions of a bead 7 extending around the rim base. The indentations 11, as shown particularly in FIG. 2, engage positively in the holding suppports 3 between the legs 12 of the latter, while in this region the legs 12 bear laterally in face-to-face contact against the flanks 13 of the boss-like indentations.

The generally U-shaped holding supports 3, with their two legs 12 and section web 14 integrally joining the legs 12, are shaped sheet metal parts. The free ends of the legs 12 are provided with outwardly directed flanges 15, which lie against the rim base on either side of the bead 7 and the boss-like indentations 11, and by which the holding supports are fastened to the rim base 6 by means of weld seams 16 extending in the direction of the periphery of the rim. The legs 12 of the holding supports 3 are provided with aligned bolt holes 17 for the passage of the threaded bolts 10. The wheel disc 2 is correspondingly provided in each of its lobes 8 with two bolt holes 18 for the passage of the screw bolts 10. The bolt connections are secured by means of nuts 19 provided with washers 20 and screwed onto the bolts 10.

Figure 5:
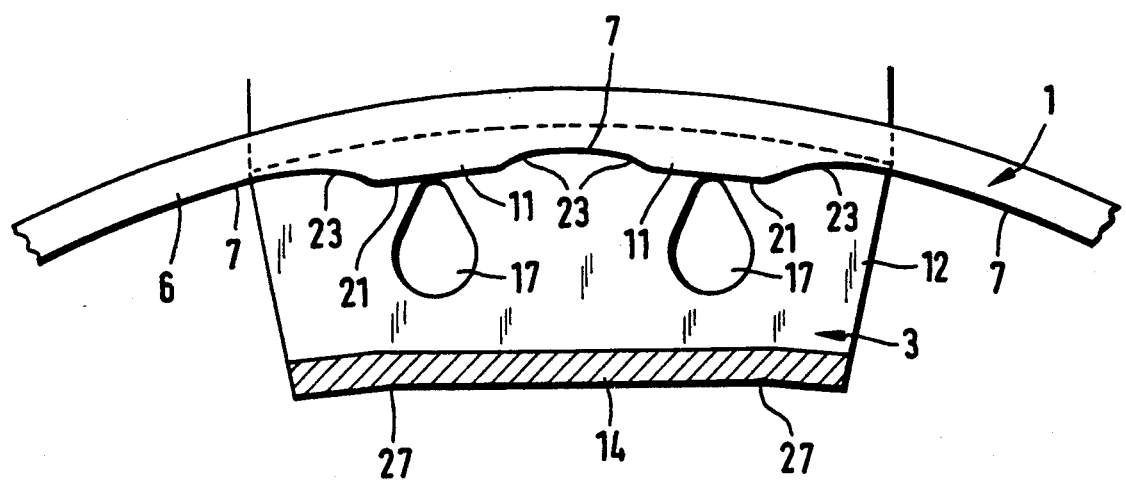
FIG. 5 is a partial section through the rim showing in longitudinal section a holding support, in the form of a double support, welded to the rim base.

As already mentioned, the boss-like indentations constitute local press-out portions or depressions in the bead 7 extending around the wheel rim 1, projecting inwardly. As shown particularly in FIGS. 2 and 4, the boss-like indentations 11 are formed symmetrically to a diametral plane of the rim 1 extending through the apex of the bead 7, their bottoms 21 being convexly curved in the direction of the wheel axis and their flanks 13 diverging in the direction of the rim base 6 and merging in the rim base 6 by way of rounded portions 22. FIG. 5 also shows that the rim 1 has two boss-like indentations 11 for each holding support 3, offset relative to each other in the peripheral direction and formed in the bead 7 extending around the rim, the distance between them in the direction of the periphery of the rim corresponding approximately to the distance between the bolt hole pairs 17 in the holding supports 3. The length of the boss-like indentations 11 in the direction of the periphery of the rim is shorter than the length of the holding supports 3 in the direction of the periphery of the rim. The boss-like indentations 11 extend at their bottoms 21 from the region of the bolt holes 17 towards both sides, in the form of flat curves, into the rim base 6, as illustrated at 23 in FIG. 5. It can also be seen in FIGS. 2 and 3 that the width of the boss-like indentations 11 is approximately equal to the width of the bead 7. Each indentation 11 projects into the support 3 axially for a minor proportion of the support's axial extent.

The legs 12 of the holding supports 3 follow at their free end regions the external contour of the boss-like indentations 11, thus achieving support of the legs 12 over a relatively large area on the flanks 13 of the indentations 11. Tightening of the screw bolts 10 serving to fasten the wheel disc holds the legs 12 of the holding supports 3 in contact against the flanks 13 of the boss-like indentations 11. The inside distance between the two legs 12 may be so adjusted as to be somewhat shorter in the support region than the distance between the outer contact surfaces of the flanks 13. The holding supports 3 are then pressed inwardly onto the indentations 11 by a degree of resilient deflection of their legs 12, so that surface prestressing is achieved. The holding supports 3 can be fastened to the rim 1 with the aid of the weld seams 16. Unfavourable loading of the weld seams 16 extending in the direction of the periphery of the rim 1, by turning forces, is reduced because of the supporting of the legs 12 on the flanks 13 against initial stress. Owing to the positive form connection between the holding supports 3 and the boss-like indentations 11 in the rim 1, the weld seams 16 are in addition relieved of axial wheel forces.

As FIG. 2 shows, the U-shaped holding supports 3, measured between their legs 12, may have a width which is considerably smaller than their height. This dimensional relationship is preferred when the track adjustment wheel is used as a front wheel on a tractor or the like. With a narrow construction of the holding supports 3, the boss-like indentations 11 are formed with a correspondingly small width dimension.

Figure 6:
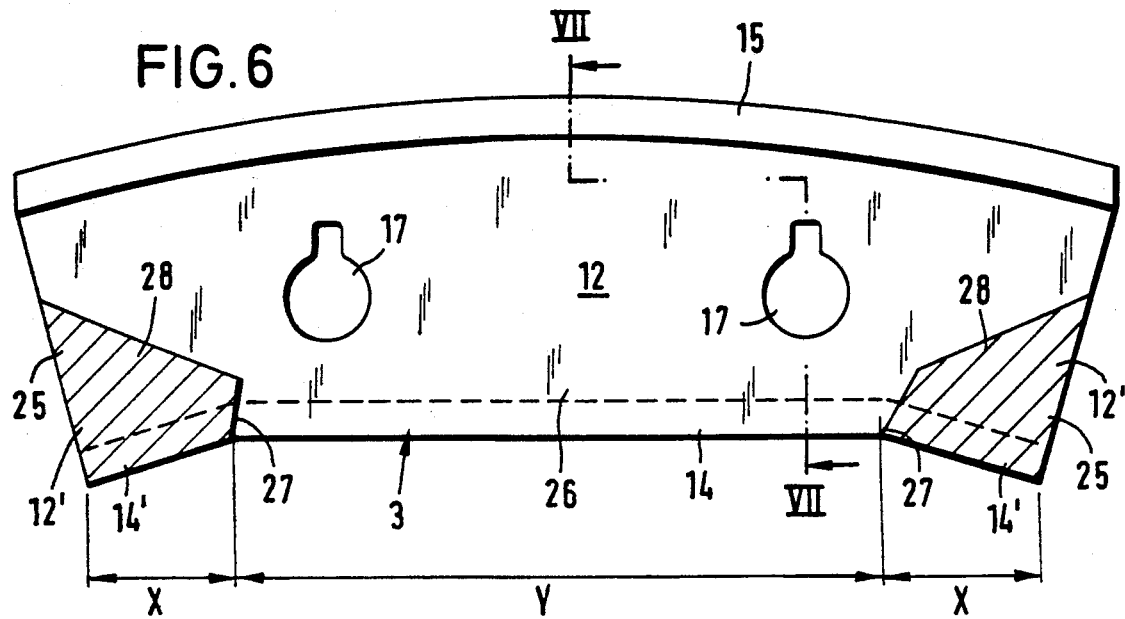
FIG. 6 is a side view on a larger scale of a holding support which is advantageously used in the track adjustment wheel.
Figure 7:
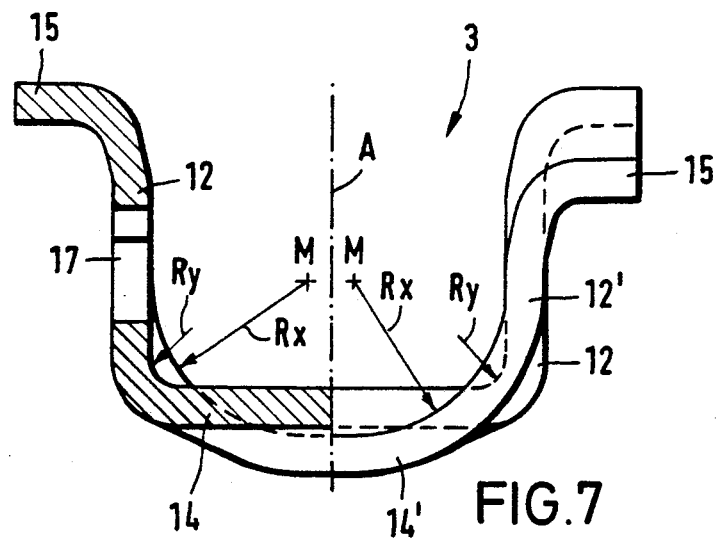
FIG. 7 shows the holding support in a section on the line VII—VII in FIG. 6 (on the left of the vertical centre line) and in an end elevation (on the right of the vertical centre line).

FIGS. 6 and 7 show an individual holding support 3 which can advantageously be used. The holding support is shown here with a greater constructional width in order to enable its design to be seen more clearly. It is however understood that the design of the holding support shown here can also be used with other width dimensions, and therefore also for the narrow holding supports shown in FIG. 2. The holding support 3 comprises in a single piece two end regions 25 which, measured over the section web of the U-shaped section, extend over a length X, and an intermediate portion 26 having the length Y. On the intermediate portion 26 the section web 14 of the U-shaped section is in the form of a flat leg. The two section legs 12 are here substantially at right angles to the section web 14; they merge into the flat web with the inside curvature radius Ry. The curvature radius Ry is relatively small; it generally amounts to about 4 to 7 millimeters. The outside surfaces of the profile webs 14 of the intermediate portion 26 form plane contact surfaces for the wheel disc lobes 8.

In the two end regions 25 of the holding support 3 the channel section is formed by the end section web 14' and the two end section legs 12'. As shown in particular in FIG. 7, the end section web 14' of the channel section is curved out towards the outside of the section in the two end regions 25 of the holding support. At the same time the two end section legs 12' are retracted into the interior of the section, relative to the position of the section legs 12 in the intermediate portion 26, in the curved transition region to the curved-out section web 14'. This means that, in the end regions 25, the end section legs 12' merge into the end section web 14' via inside curvature radii Ry in the intermediate portion 26 of the holding support. The arrangement is in this case such that the curvature radius Rx increases gradually from the transition 27 (FIG. 6) to the intermediate portion 26, in the direction of the neighbouring end of the holding support, thus forming the bend which is formed in the section web in the end regions 25 and which is shown in FIG. 6. The inside radius of curvature Rx is expediently considerably greater, preferably at least about 4 to 6 times as great as the radius of curvature Ry in the region of the intermediate portion 26. The radius of curvature Rx at the ends of the holding support may be at least approximately equal to half the inside width of the section. The centre of curvature M is in this case situated in or close to the vertical centre axis A of the channel section. The length X of the end regions 25 of the holding support 3 which are shaped in this manner expediently amounts to about 10 to 20% of the total length of the holding support, measured over its entire section web 14,14'.

As FIG. 6 shows, the bolt holes 17 for the threaded bolts 10 are situated away from the shaped end regions 25, that is to say in the region of the intermediate portion 26 on the section legs 12, but close to the transitions 27 to the end regions 25. The axes of the holes are situated approximately at the height of the centre M of the radii of curvature Rx.

The above-described conformation of the holding supports 3 significantly reduces harmful concentrations of tension, particularly in the critical end regions and above all in the region of the radii of curvature Rx and Ry respectively. The lengthening of the radii of curvature Ry at the transitions between the end section legs 12' and the end section web 14' leads to conditions of contact, between the wgheel disc lobes 8 and the section legs of the holding supports, which are favourable in respect of strength. In particular, the effect is thereby achieved that in the critical end regions of the holding supports no contact is made with the wheel disc lobes 8. In FIG. 6 the areas in which no contact is made between the wheel disc and the section legs 12' in the two end regions 25 of the holding support 3 are indicated at 28 by hatching. The wheel disc lobes 8 are on the contrary supported only on the rectilinear section legs 12 over a large area in the intermediate region 26, where the screw bolts 10 are also situated. The transition regions 27 to the shaped end regions of the holding support 3 are indicated in FIG. 5 for the holding support shown in FIG. 2.

The bolt holes 17 are in the form of oblong holes or keyholes, the threaded bolts 10 being provided on their heads 29 with cams 30 which prevent rotation by engaging in the bolt holes (FIG. 2).

It is clear that in the track adjustment wheel described, given suitable adaptation of the wheel dish, it is also possible to provide more than four holding supports, and that instead of double supports it is also possible to use single supports. By means of the bead 7 extending around the rim the latter is additionally stiffened and in addition the formation of the boss-like indentations 11 during manufacture is simplified. However, the formation of the bead 7 extending around the rim may also be dispensed with.

Track adjustment is made in known manner by connecting the wheel dish 2, turned to face one way or the other, either to the left-hand or to the right-hand section leg 12 of the holding supports 3 welded eccentrically to the wheel rim.

I claim:

1. A track adjustment wheel comprising:
a central wheel disc;
a generally cylindrical peripheral rim, said rim having an axis and a base facing the wheel disc and concentric therewith;
a plurality of U-shaped holding supports circumferentially spaced around the rim base, said holding supports having legs and axially aligned bolt-holes, the legs being provided with outwardly directed flanges which lie against the rim base and at which the holding supports are welded to the rim base by welding seams extending circumferentially of the rim base;
bolts extending axially through the bolt-holes and engaging the central wheel disc to mount the central wheel disc detachably to the peripheral rim; and,
an inwardly projecting bead arranged on and extending around the rim base, said bead having a cross section substantially in the form of a flattened V;
boss-like projections being formed in the bead by locally pressed inward portions of the bead, said boss-like projections having flank portions and extending radially inwardly into the holding supports between the legs thereof with the legs axially engaged against said flank portions relieving said welding seams of stress.

2. A track adjustment wheel as claimed in claim 1, in which the boss-like projections are symmetrical about a plane perpendicular to said axis.

3. A track adjustment wheel as claimed in claim 2, in which the flank portions of the boss-like projections diverge towards the rim base and merge via curves therewith.

4. A track adjustment wheel as claimed in claim 2, in which the boss-like projections comprise inwardly-facing bottom portions, said bottom portions being curved convexly towards the rim axis.

5. A track adjustment wheel as claimed in claim 1, in which the boss-like indentations have substantially the same axial width as the bead.

6. A track adjustment wheel as claimed in claim 1, in which the holding supports are circumferentially longer than the boss-like projections engaged therewith.

7. A track adjustment wheel as claimed in claim 6, in which the boss-like projections are in circumferential registry with the bolt-holes of the holding supports.

8. A track adjustment wheel as claimed in claim 1, in which each holding support is a double holding support defining two sets of axially extending bolt-holes.

9. A track adjustment wheel as claimed in claim 1, in which the holding supports have a radial height and an axial width across their legs and the radial height of the holding supports is greater than the axial width across their legs.

10. A track adjustment wheel as claimed in claim 1, in which the holding supports comprise web sections joining inner ends of the legs, and additionally comprise a circumferentially intermediate region and end regions, the web section in said end regions being curved towards the rim axis.

11. A track adjustment wheel as claimed in claim 10 in which said web sections join said inner ends of said legs with a curvature having an inside radius and the inside radius of curvature between the legs and web section is larger in the end regions than in the intermediate region.

12. A track adjustment wheel as claimed in claim 11, in which said inside radius of curvature increases gradually from the intermediate-end region transition, toward the end of the holding support.

13. A track adjustment wheel as claimed in claim 11, in which the axial bolt-holes of the holding support are located in the intermediate region.

14. A track adjustment wheel as claimed in claim 1, in which the wheel disc is a lobed disc.

* * * * *